US008725331B2

(12) United States Patent
Yoshida

(10) Patent No.: US 8,725,331 B2
(45) Date of Patent: May 13, 2014

(54) CHARGE-DISCHARGE MANAGEMENT APPARATUS AND SYSTEM FOR VEHICLE

(75) Inventor: Ichiro Yoshida, Takahama (JP)

(73) Assignee: DENSO CORPORATION, Kariya (JP)

( * ) Notice: Subject to any disclaimer, the term of this patent is extended or adjusted under 35 U.S.C. 154(b) by 253 days.

(21) Appl. No.: 13/210,498

(22) Filed: Aug. 16, 2011

(65) Prior Publication Data

US 2012/0053771 A1 Mar. 1, 2012

(30) Foreign Application Priority Data

Aug. 30, 2010 (JP) ................................. 2010-192455

(51) Int. Cl.
*B60L 11/18* (2006.01)
*B60L 3/00* (2006.01)
*B60L 11/02* (2006.01)
*B60L 11/12* (2006.01)

(52) U.S. Cl.
USPC .......................................................... 701/22

(58) Field of Classification Search
USPC .......................................................... 701/22
See application file for complete search history.

(56) References Cited

U.S. PATENT DOCUMENTS

| 5,778,326 A * | 7/1998 | Moroto et al. ............... 701/22 |
| 5,832,396 A * | 11/1998 | Moroto et al. ............... 701/22 |
| 2008/0319596 A1 * | 12/2008 | Yamada ......................... 701/22 |
| 2008/0319597 A1 * | 12/2008 | Yamada ......................... 701/22 |
| 2009/0299558 A1 * | 12/2009 | Hidaka ......................... 701/22 |
| 2010/0121514 A1 * | 5/2010 | Kato et al. ..................... 701/22 |
| 2010/0131139 A1 | 5/2010 | Sakai et al. |
| 2010/0305799 A1 * | 12/2010 | Yamada et al. ................. 701/22 |
| 2011/0022255 A1 * | 1/2011 | Yamada et al. ................. 701/22 |

FOREIGN PATENT DOCUMENTS

| JP | A-H10-170293 | 6/1998 |
| JP | A-2000-059918 | 2/2000 |
| JP | A-2003-111209 | 4/2003 |
| JP | A-2005-210843 | 8/2005 |
| JP | A-2006-112932 | 4/2006 |
| JP | A-2009-207327 | 9/2009 |
| JP | A-2010-076543 | 4/2010 |

OTHER PUBLICATIONS

Office Action mailed on Aug. 21, 2012 issued in corresponding JP application No. 2010-192455 (and English translation).
Office Action mailed Apr. 16, 2013 in corresponding JP Application No. 2010-192455 (and English translation).

* cited by examiner

*Primary Examiner* — Khoi Tran
*Assistant Examiner* — Dale Moyer
(74) *Attorney, Agent, or Firm* — Posz Law Group, PLC

(57) ABSTRACT

A charge-discharge management system for a vehicle running using electricity stored in a battery is disclosed. The system creates a charge-discharge schedule of the battery for a travel route of the vehicle according to the travel route of the vehicle and a condition of the vehicle or a road, so that a charge amount of the battery falls within a predetermined range in the travel route. The systems corrects the charge-discharge schedule by comparing between the charge amount actually in the battery and the charge amount in the charge-discharge schedule.

6 Claims, 11 Drawing Sheets

CHARGE-DISCHARGE MANAGEMENT APPARATUS AND SYSTEM FOR VEHICLE

CROSS REFERENCE TO RELATED APPLICATION

The present application is based on and claims priority to Japanese Patent Application No. 2010-192455 filed on Aug. 30, 2010, disclosure of which is incorporated herein by reference.

TECHNICAL FIELD

The present disclosure relates to a charge-discharge management system and apparatus for a vehicle, which manages a rechargeable battery mounted to, for example, an electric vehicle, a hybrid vehicle or the like.

BACKGROUND

An electric vehicle has the following problem. When the vehicle is traveling, the vehicle stops by running out of a battery, or the battery is damaged by overcharge. To address the above problem, Patent Document 1 discloses the following technique. An energy state of a battery mounted to a vehicle is determined. When the electricity is insufficient, the vehicle receives electricity supply from an outside of the vehicle. When the electric power is sufficient, the vehicle supplies the electricity to an outside of the vehicle.

Patent Document 1: JP-2005-210843

In the technique of Patent Document 1, the state of the battery is uniformly managed based on only the energy state of the battery at the present time. This technique involves the following problem. For example, let us assume that a vehicle is about to go downhill from now on. In this case, this vehicle stores electricity in the battery by regenerative braking or the like when going downhill. Thus, the manner of uniformly managing the energy state of the battery may cause overcharge when the vehicle is going downhill, and may have an adverse effect on the battery. In particular, if weight of load actually carried by the vehicle is larger than that according to a travel schedule, an amount of energy stored when the vehicle is going downhill increases, and the overcharge may easily occur.

It is assumed that the vehicle is about to travel on a hilly road from now on. In this case, an electricity consumption amount will become larger than when the vehicle will travel on a flat road. Thus, the manner of uniformly managing the enegery state of the battery may cause the run out of the battery while the vehicle is traveling. In particular, if weight of an object actually carried by vehicle is larger than that according to a travel schedule, an amount of energy consumed when the vehicle is traveling on the hilly road increases, and thus, the run out of the vehicle may easily occur.

SUMMARY

In view of the foregoing, it is an objective of the present disclosure to provide a charge-discharge management system and apparatus for a vehicle that can appropriately manage a state of a battery according to a travel route, a vehicle condition or the like.

According to a first aspect of the present disclosure, a charge-discharge management system for a vehicle that runs using electricity stored in a battery is provided. The charge-discharge management system includes a charge-discharge schedule creation unit and a charge-discharge schedule correction unit. The charge-discharge schedule creation unit is configured to create a charge-discharge schedule of the battery for a travel route of the vehicle according to the travel route of the vehicle and a condition of at least one of the vehicle and a road, so that a charge amount of the battery falls within a predetermined range in the travel route. The charge-discharge schedule correction unit is configured to: divide the travel route into a plurality of sections; make a comparison between the charge amount actually in the battery and the charge amount in the charge-discharge schedule at every section of the plurality of sections, thereby providing a result of the comparison; and correct the charge-discharge schedule for subsequent sections according to the result of the comparison, wherein the subsequent sections are sections subsequent to where the comparison is made.

According to a second aspect of the present disclosure, a charge-discharge management apparatus mounted to a commercial vehicle that travels using electricity stored in a battery of the commercial vehicle is provided. The charge-discharge management apparatus includes a communication device, a charge-discharge schedule creation device, a charge-discharge schedule correction device and a charge-discharge schedule re-creation device. The communication device is configured to communicate with a center to receive information on a business schedule indicating a travel route of the vehicle for transportation of goods. The charge-discharge schedule creation device is configured to create a charge-discharge schedule of the battery for the travel route of the commercial vehicle according to the business schedule and a condition of at least one of the commercial vehicle and a road. The charge-discharge schedule is a schedule for charging and discharging the battery to keep a charge amount of the battery within a predetermined range all along the travel route. The charge-discharge schedule correction device is configured to correct the charge-discharge schedule correction by: dividing the travel route into a plurality of sections; making a comparison between the charge amount actually in the battery and the charge amount in the charge-discharge schedule at every section of the plurality of sections, thereby providing a result of the comparison; and correcting the charge-discharge schedule for subsequent sections according to the result of the comparison, the subsequent sections being sections subsequent to where the comparison is made. The charge-discharge schedule re-creation device is configured to re-create the charge-discharge schedule in response to a change in the business schedule. The condition of the commercial vehicle includes an amount of load carried by the commercial vehicle. The condition of the road includes at least one of: uphill and downhill of the road; unevenness of the road; and curvature radius of the road.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be described with reference to the accompanying drawings.

Figure 1:
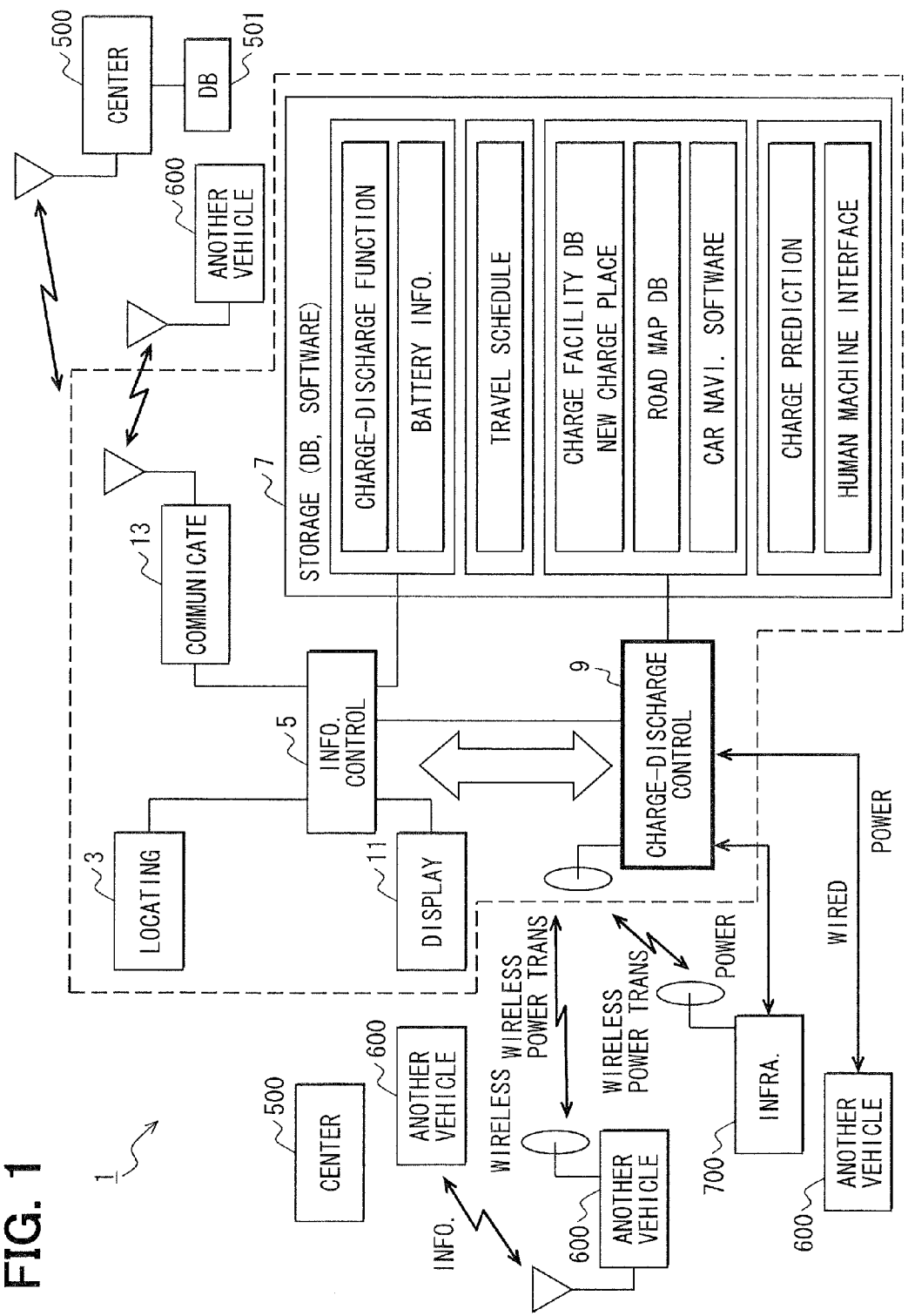
FIG. 1 is a system block diagram illustrating a whole configuration of a charge-discharge management system for a vehicle.

1. Configuration of Charge-discharge Management System 1 for Vehicle (1) Whole Configuration of Charge-discharge Management System 1 for vehicle The charge-discharge management system 1 for a vehicle is mounted to an electric vehicle or a hybrid vehicle, each of which travels using electricity stored in a rechargeable battery 101. The vehicle equipped with the charge-discharge management system 1 is referred to herein as "subject vehicle". The charge-discharge management system 1 manages the electricity (i.e., charge amount) of the rechargeable battery 101 of the subject vehicle. A whole configuration of this charge-discharge management system 1 for a vehicle will be described with reference to FIG. 1. The charge-discharge management system 1 for a vehicle is also referred to as a charge-discharge management apparatus 1.

The charge-discharge management system 1 includes a locating device 3, an information control device 5, a storage 7 (storage means), a charge-discharge control block 9, a display device 11, and a communication device 13. The locating device 3 has a function to locate the subject vehicle by measuring where the subject vehicle is traveling or parking. The locating device 3 may be achieved by a GPS (Global Positioning System) device.

The information control device 5 reads a data or a program stored in the storage 7 and performs various charge-and-discharge-related control processes. The storage 7 stores the data and programs associated with the followings (a) to (g).

(a) A charge-discharge function of the subject vehicle (compatible with wired change, wireless change and or charge, acceptable voltages).

This is a data indicating what kinds of functions for charge-discharge the vehicle is provided with. Examples are as follows:

(a-1) in a wired manner, capable of charging and discharging the rechargeable battery 101;

(a-2) in a wired manner, capable of only charging the rechargeable battery 101;

(a-3) in a wired manner, capable of only discharging the rechargeable battery 101;

(a-4) no charge-discharge function;

(a-5) in a wireless manner, capable of charging and discharging the rechargeable battery 101;

(a-6) in a wireless manner, capable of only charging the rechargeable battery 101;

(a-7) in a wireless manner, capable of only discharging the rechargeable battery 101;

(a-8) no wireless charge-discharge function;

(a-9) useable wireless-frequency (high frequency, low frequency, light);

(a-10) quick charge and discharge (compatible, not compatible);

(a-11) acceptable voltage (multiple (automatic setting), multiple (manual setting), single); and (a-12) commercial power source conversion voltage (plug-in hybrid).

(b) information on rechargeable battery of subject vehicle (system, structure, charge control method, capacity, output).

This information indicates a configuration of the rechargeable battery 101 as follows.

System: lithium (integral battery (whole charging)), lithium (integral battery, cell individual control (individual cell charging)), lithium (discrete type battery (some of cells are replaceable) (individual cell array charging), aggregate battery (combining multiple small cell, thereby outputting needed electricity (individual cell array charging)), Lead battery, etc.

Structure: battery alone, via a power control function, dual structure.

Charge control method.

(c) travel schedule (travel route, via-point information, change (weight change) in carried load, change in number of passengers), charging-discharging facility DB (location, function: compatible with wired charging, wireless charging or quick charging, capability), a new-constructed charging facility (received from a center 500 having a database 501). The above information includes schedule information that is transmitted from a management center to the vehicle for physical distribution service, and that is received and recorded by the vehicle. It should be noted that a change in loading point or weight of the carried load is used for predicting a charge-discharge schedule.

(d) Road map DB (node, link, three dimensional positional information, height, uphill and downhill, curvature, road surface friction factor)

The road map DB is used for travel route calculation. Since the uphill and down hill of a road influences battery drain and recovery of the rechargeable battery, information on the uphill and downhill is important. In addition, since the friction factor of a road surface influences loss of electricity when the vehicle is traveling on the road surface, the information on the friction factor is important. An efficiency of regenerative braking is degraded depending on a braking manner when the vehicle is going downhill. The curvature of a road is used in conjunction with driver's driving characteristic in order to predict electricity recovery rate.

(e) Navigation software (travel route calculation)

The navigation software may be normal car navigation software. In order to make a charge-discharge prediction, the travel route is calculated using this navigation software. The below-described energy balance line is predicted from the travel route and the uphill and down hill or the curvature of a road in the road map DB.

(f) Battery charge-discharge prediction program (charge-discharge simulator)

The Battery charge-discharge prediction program may be known software for predicting how the charge amount of the battery at the present time or at a specific location will change when the vehicle travels a certain road section. A prediction for battery charge and discharge is made from road information of a road section, weight of load carried by the vehicle (change in weight of the subject vehicle), charging-discharging infrastructure information, chargeable vehicle presence information, and the like.

(g) Human machine interface (user input output program (route selection, charge-discharge selection, point management))

A condition of a secondary battery (information on charge and discharge, cursing distance), infrastructure information or the like is displayed. In addition, a selection window is displayed when there is a choice that is to be made by a user in the next section. Regarding an item selected by a user, a changed charge-discharge schedule is indicated.

The charge-discharge control block 9 controls wireless or wired electricity transmission between the vehicle and an outside of the vehicle. Details will be described later. The display device 11 may include a commonly-used display and provides various displays to a user.

The communication device 13 has a function to communicate with the center 500 and vehicles 600 other than the subject vehicle. The center 500 and the other vehicles 600 are external to the subject vehicle. The vehicle 600 other than the subject vehicle is also called "another vehicle 600" or "other vehicles 600". The communication device 13 receives a power feed request from another vehicle 600 or transmits a power feed request to another vehicle 600. From the center 500, the communication device 13 receives traffic information or information associated with transportation of load (if the subject vehicle is used for transportation business).

(2) Configuration of Charge-discharge Control Block 9

The charge-discharge control block 9 will be described with reference to FIG. 2. The charge-discharge control block 9 includes a main charge-discharge management device 15, a power source detection selection device 17, an electric power converter 19, and a wireless electric power transmission reception device 21.

The main charge-discharge management device 15 receives or transmits electric power (electricity) in a wired manner or a wireless manner, and optimizes a charge state of the rechargeable battery 101. For example, the main charge-discharge management device 15 manages the electricity transmission and reception to prevent the rechargeable battery 101 from being over-discharged or over-charged. The main charge-discharge management device 15 may include a computer with a CPU (central processing unit), a memory, an I/O (input/output) and the like. The main charge-discharge management devices 15 (e.g., CPU) performs the below-described various processes in accordance with programs stored in the memory, thereby acting as a charge-discharge schedule creation means, unit or device, a charge-discharge schedule correction means, unit or device, and a charge-discharge schedule re-creation means, unit or device. The main charge-discharge management device 15 may include a battery cell charging controller.

The power source detection selection device 17 identifies the type of received electric power (received electricity). Specifically, since the received electric power may be in various states (commercial electricity 100V, 200V, three-phase alternating current, direct current 24V, direct current 12V, and the like), the type of received electric power is identified by the power source detection selection device 17. As shown in FIG. 2, the electric power may be supplied from a 100V commercial power source 111 with an input output terminal, a 200V commercial power source 113 with an input output terminal, a 24V charging power source 115 with an input output terminal, or a 12V charging power source 117 with an input output terminal.

When the type of received electric power is identified, the electric power converter 19 coverts it into electric power for use in charging the rechargeable battery 101. Depending on a manner of charging the battery 101 such as charging the rechargeable battery 101 as a whole, charging an individual cell, or the like, the electric power converter 19 creates a most suitable voltage or current. Since it is conceivable that the rechargeable battery 101 is provided in several forms, the electric power converter 19 creates a most suitable electric power (voltage, current) depending on the format of the rechargeable battery 101. The electric power converter 19 is also used to charge the rechargeable battery 101 using an energy generated in the subject vehicle (e.g., energy generated by an in-vehicle electricity generator 105 or a regenerative brake 107). Further, in order to prevent the over-charging of the rechargeable battery 101, the electric power converter 19 has a function to convert the electric power of the rechargeable battery 101 into an electric power that an in-vehicle energy storing device 103 can use. It may be preferable that the in-vehicle energy storing device 103 includes a device that uses an excess energy for a cooling storage. For example, when the vehicle goes down a high mountain, there is a possibility that the over-charge occurs. In this probable case, a cool storage agent is cooled with the excess energy and made into a low temperature body. When the vehicle has gone down to a plain field, the low temperature body can be efficiently used for cooling a compartment.

The wireless electric power transmission reception device 21 is connected to the main charge-discharge management device 15, and has a function to wirelessly transmit an electric power to an outside of the vehicle in order to prevent the over-charging of the rechargeable battery 101. Further, the wireless electric power transmission reception device 21 has a function to wirelessly receive an electric power from the outside. The received electric power can be used to charge the rechargeable battery 101. A point may be provided to a user depending on an amount of electric power that is transmitted to the outside of the subject vehicle via the wireless electric power transmission reception device 21 in order to prevent the over-charging. The point may be used to pay for an electric power supplied from an infrastructure 700 or another vehicle 600. The wireless electric power transmission reception device 21 may include a transmission method selector, which switches between short distance transmission and long distance transmission.

2. Process Performed by Charge-discharge Management System 1 for vehicle

Processes performed by the charge-discharge management system 1 for a vehicle (more specifically, the main charge-discharge management devices 15) will be described.

(1) Charge-discharge Schedule Creation Process

Figure 3:
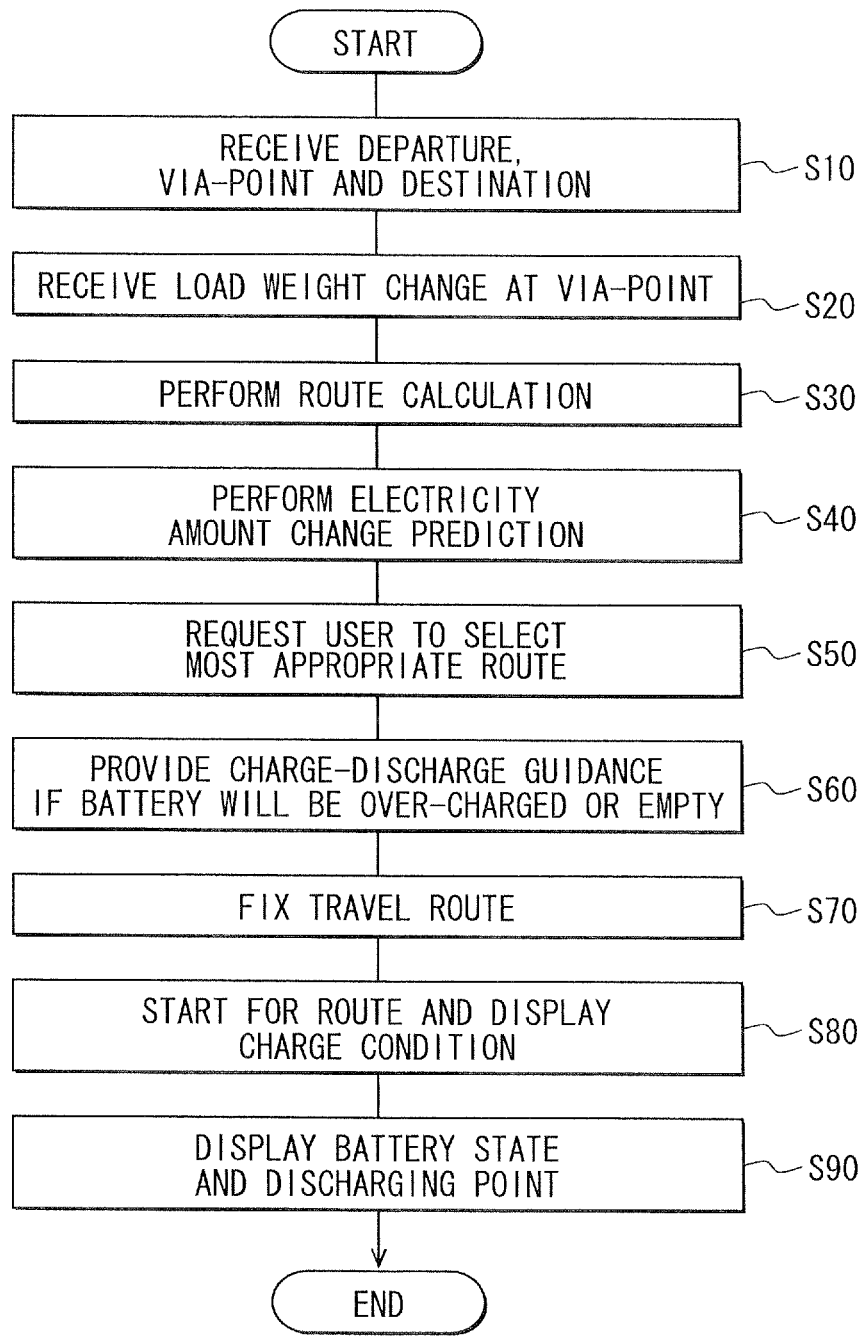
FIG. 3 is a flowchart illustrating a charge-discharge schedule creation process.

The charge-discharge schedule creation process will be described based on the flowchart illustrated in FIG. 3. This process is performed in response to start up of the charge-discharge management system 1 for a vehicle.

At S10, the main charge-discharge management devices 15 receives an input of a data of a departure point, a destination point, and a via-point of a travel route. A user may input the departure point, the destination point, and the via-point. Alternatively, the main charge-discharge management device 15 may read a data sent from an operation scheduler of the center or an individual's scheduler, so that the departure point, the destination point, and the via-point are inputted.

At S20, a change in weight of carried load (e.g., goods, passenger) at the via-point is inputted to the charge-discharge management system 1. A user of the vehicle may input this change in weight of carried load. Alternatively, the main charge-discharge management device 15 may read a data sent from the operation scheduler of the center or the individual's scheduler, so that the change in weight of carried load (e.g., goods, passenger) at the via-point is inputted.

At S30, based on the data inputted at S10 and S20, a travel route calculation is performed, and multiple candidates for the travel route are obtained. The travel route calculation is performed using the above-described car navigation software. The travel route includes information on the uphill and downhill of a road. The travel route further includes information on an infrastructure (facility where charging and discharging can be performed) that exits along the travel route.

At S40, the travel route is divided into multiple sections, so that each boundary between the sections is a point at which there is a change in road shape, road undulation (i.e., uphill and downhill), road curvature or the like. Information on the boundary between the sections can be acquired from the above-described road map DB. Electric power consumption in each of the determined sections is calculated. This calculation of the electric power consumption takes into account the undulation (height levels) of the section, the change in weight of carried load (e.g., goods, passenger), altitude difference, and the like. For each of the multiple candidates for the travel route, the electric power consumption is calculated. In this way, at S40, a change in charge amount of the rechargeable battery 101 in the travel route is predicted from the uphill and downhill (movement with height change) of each of the sections, and the weight of the vehicle in each of the sections.

At S50, a result of the calculation at S40 is provided to a user. For example, the multiple candidates for the travel route and the electric power consumptions in respective multiple candidates are displayed to a user. By seeing this information, a user can select a most appropriate travel route. That is, the main charge-discharge management device 15 displays the multiple candidates along with selection reasons on the display device 11, and requests a user to select a most appropriate route from the multiple candidates.

At S60, the main charge-discharge management device 15 creates the charge-discharge schedule of the rechargeable battery 101 for the travel route that is selected by the user in response to display of the multiple candidates at S50, so that the charge-discharge schedule keeps the charge amount of the rechargeable battery 101 within a predetermined range in the travel route. Detail of creating the charge-discharge schedule will be later described with reference to a concrete example. If, according to the charge-discharge schedule, the rechargeable battery 101 is expected to be in an over-charging state or an empty state just after the vehicle starts to travel, guidance is provided to a user. For example, the main charge-discharge management device 15 provides information prompting a user to previously charge or discharge the rechargeable battery 101 to adjust the charge amount of the rechargeable battery 101 to an optimum charge amount. The main charge-discharge management device 15 may display multiple candidates of a method of optimizing the charge amount in the travel route selected by the user, so that a user can select a method of optimizing the charge amount.

At S70, the charge-discharge schedule for the travel route is fixed and recorded. The fixed charge-discharge schedule is set as an initial charge-discharge schedule. For all route, the charge-discharge schedule is executed. At S80, the charging condition (charge state) of the rechargeable battery 101 is displayed after the vehicle starts traveling. At S90, a battery condition is notified to a user, and guidance on charge-discharge is provided to a user. The guidance on charge-discharge includes displaying a place where the discharging is to be done. For example, a place at which the electricity is to be supply to an outside of the vehicle or stored in an inside of the vehicle is displayed.

Figure 4:
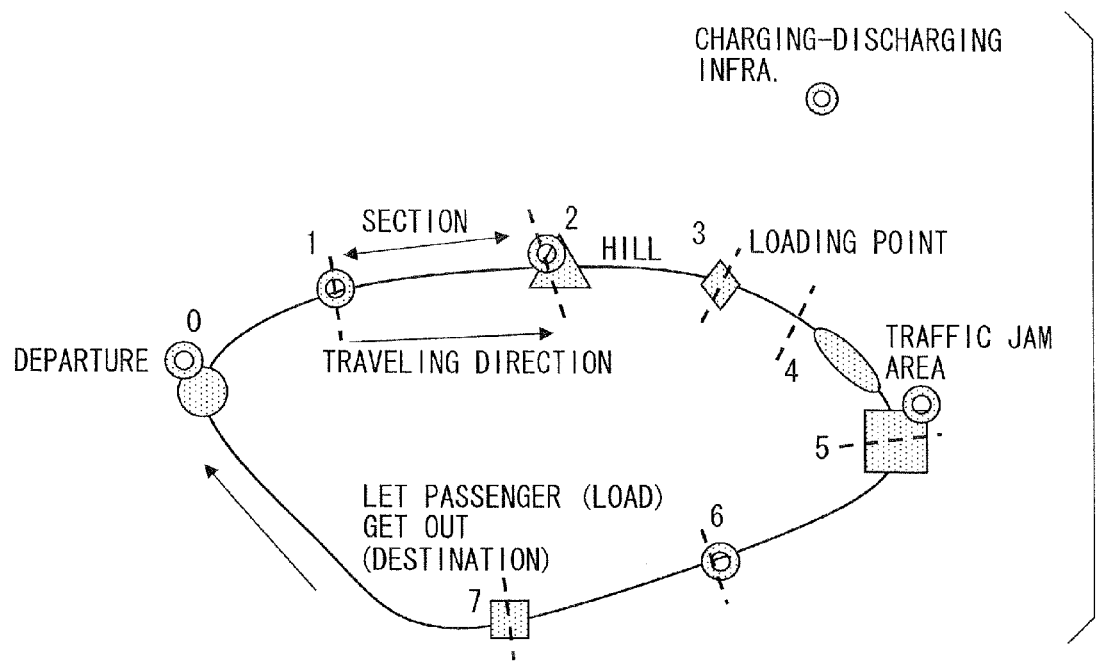
FIG. 4 is a diagram illustrating a travel route divided into multiple sections.

Next, the creation of the charge-discharge schedule at S60 will be more specifically described with reference to FIGS. 4 to 8. FIG. 4 illustrates one example of the travel route calculated at S30. The travel route is divided into multiple sections, boundaries of which are points "1 to 7" on the travel route.

The vehicle travels the guidance route in a direction from the point "1" to the points "2, 3 . . . to 7" in this order. In the following, a section from the point "i" to the point "i+1" is expressed as a section "i-(i+1)", where i=0, 1, 2, 3 . . . 7. Further, a section from the point "7" to the point 0 is expressed as a section "7-0". The point "0" is the departure point. The point "3" is a point (via-point) where a load is scheduled to be took in the vehicle. The point "7" is a point (destination) where a load is scheduled to be took out of the vehicle.

Figure 5:
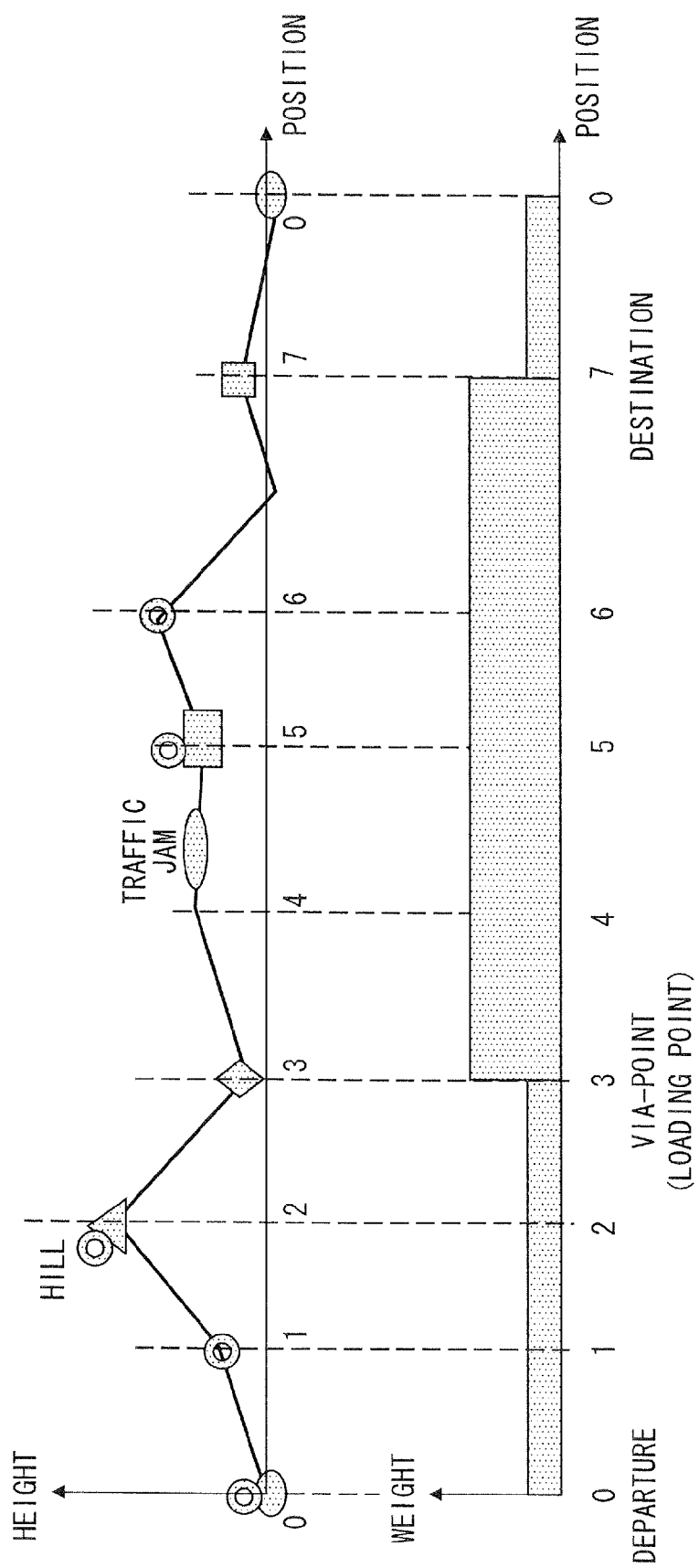
FIG. 5 is a diagram illustrating a variation in height of a travel route and a schedule (operation schedule) relating to a weight of load carried by a vehicle that travels on the travel route.

FIG. 5 illustrates a change in height (undulation) of the travel route of FIG. 4 (see the upper part of FIG. 5). FIG. 5 further illustrates a schedule (business schedule) for the weight of the load in the vehicle traveling the travel route of FIG. 4 (see the lower part of FIG. 5). In FIG. 5, the load is scheduled to be took in the vehicle at the point "3" and took out of the vehicle at the point "7".

Figure 6:
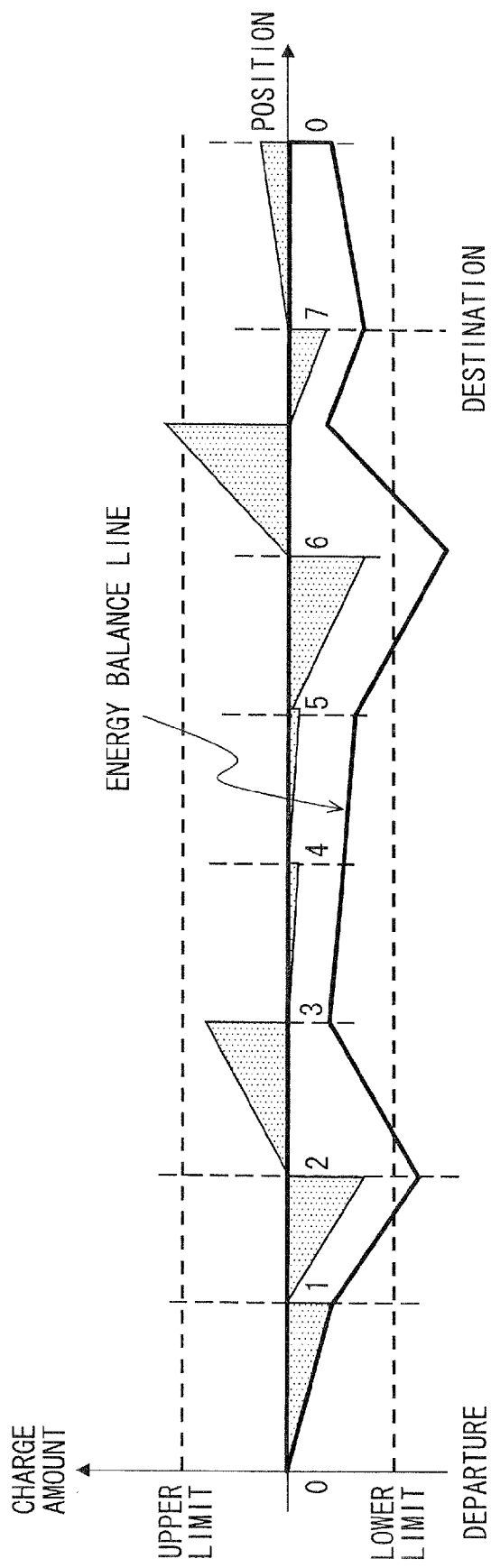
FIG. 6 is a graph illustrating an energy balance line.
Figure 8:
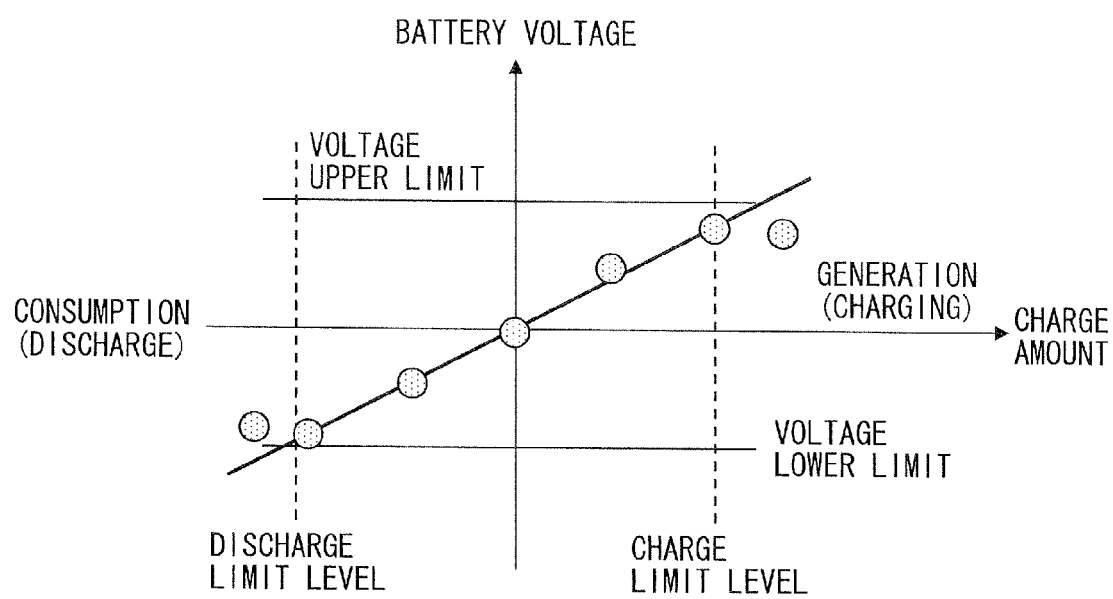
FIG. 8 is a graph illustrating charge-discharge characteristics of a battery.

FIG. 6 is a graph illustrating a transition (energy balance line) of the charge amount stored in the rechargeable battery 101 of the vehicle in a situation where: the vehicle travels the travel route of FIGS. 4 and 5 without taking steps of, for example, charging or discharging the rechargeable battery 101 at the infrastructure on the way, generating the electricity by consuming the fuel, or the like. In FIG. 6, the vertical axis indicates the charge amount stored in the rechargeable battery 101. An upper portion of the vertical axis indicates a larger charge amount. An upper limit and a lower limit described in the vertical axis indicate an upper limit and a lower limit of a preferable predetermined range of the charge amount of the rechargeable battery 101, respectively. These upper and lower limits are, as shown in FIG. 8, upper and lower limits of a range where a battery voltage and a charge amount (amount of stored electricity) have a linear transition relation. The horizontal axis in FIG. 6 indicates position of the vehicle on the travel route. A right side portion of the horizontal axis indicates that the vehicle is closer to the destination point.

The energy balance line changes in the following way.

Basically, as the vehicle travels, the charge amount stored in the rechargeable battery 101 decreases (the energy balance line goes down) due to, for example, a friction energy or the like caused by the traveling of the vehicle.

When the vehicle goes uphill (e.g., the section "0-1", the section "1-2", the section "3-4", the section "5-6" etc.), the charge amount significantly decreases due to an increase in potential energy in addition to due to the above-described friction energy. In particular, the decrease in the charge amount is significant when the vehicle goes uphill while carrying a large amount of a load.

Figure 2:
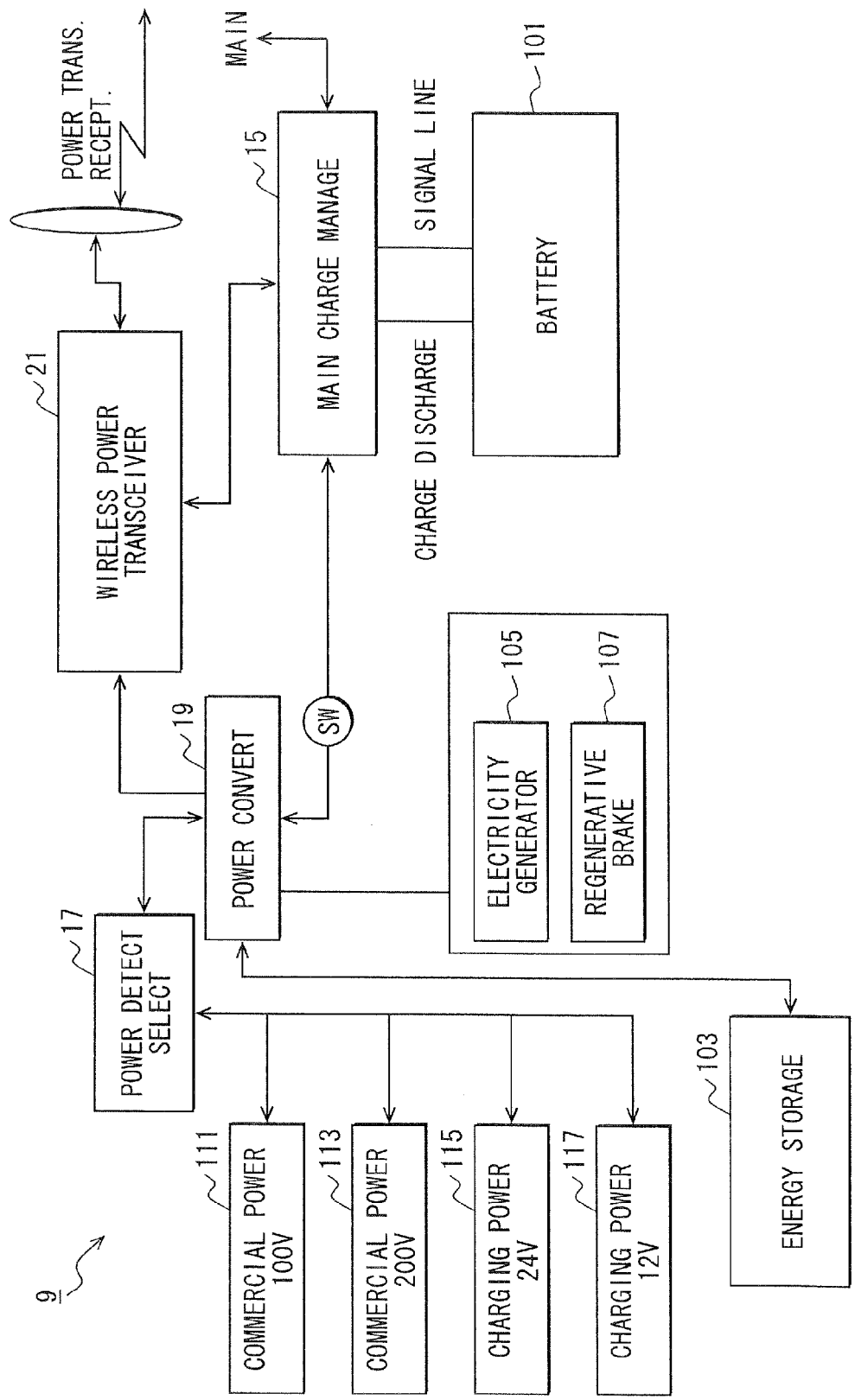
FIG. 2 is a system block diagram illustrating a configuration of a charge-discharge control block.

When the vehicle goes downhill (e.g., the section "2-3", the section "6-7"), the charge amount stored in the rechargeable battery 101 increases because the potential energy of the vehicle is recovered with the in-vehicle electricity generator 105 and the regenerative brake 107 (see FIG. 2). In particular, the increase in the charge amount is significant when the vehicle goes downhill while carrying a large amount of a load.

In FIG. 6, a triangle region described in each section indicates how much the rechargeable battery 101 is charged or discharged in the section. Each triangle above a reference line indicates a charged amperehour (i.e., an increase in charge mount). Each triangle below the reference line indicates a discharged amperehour.

The charge-discharge management system 1 for a vehicle calculates the energy balance line for the travel route (see FIG. 6) based on the change in height and the schedule (operation schedule) for the weight of a load carried in the vehicle (see FIG. 5).

Next, the charge-discharge management system 1 for a vehicle determines whether the energy balance line falls within the upper limit and the lower limit of the predetermined range of the charge amount. In the case illustrated in FIG. 6, the energy balance line falls blow the lower limit in the vicinity of the point "6". If the energy balance line falls below the lower limit at a specific point, the charge-discharge management system 1 allows the rechargeable battery 101 to be charged with the external infrastructure at a point just before the specific point, so that the charge amount stored in the rechargeable battery 101 can increase. For example, in the case of FIG. 7, the charge-discharge management system 1 allows the rechargeable battery 101 to be charged at the points 1, 5 with the external infrastructure to prevent the energy balance line from falling below the lower limit.

Figure 7:
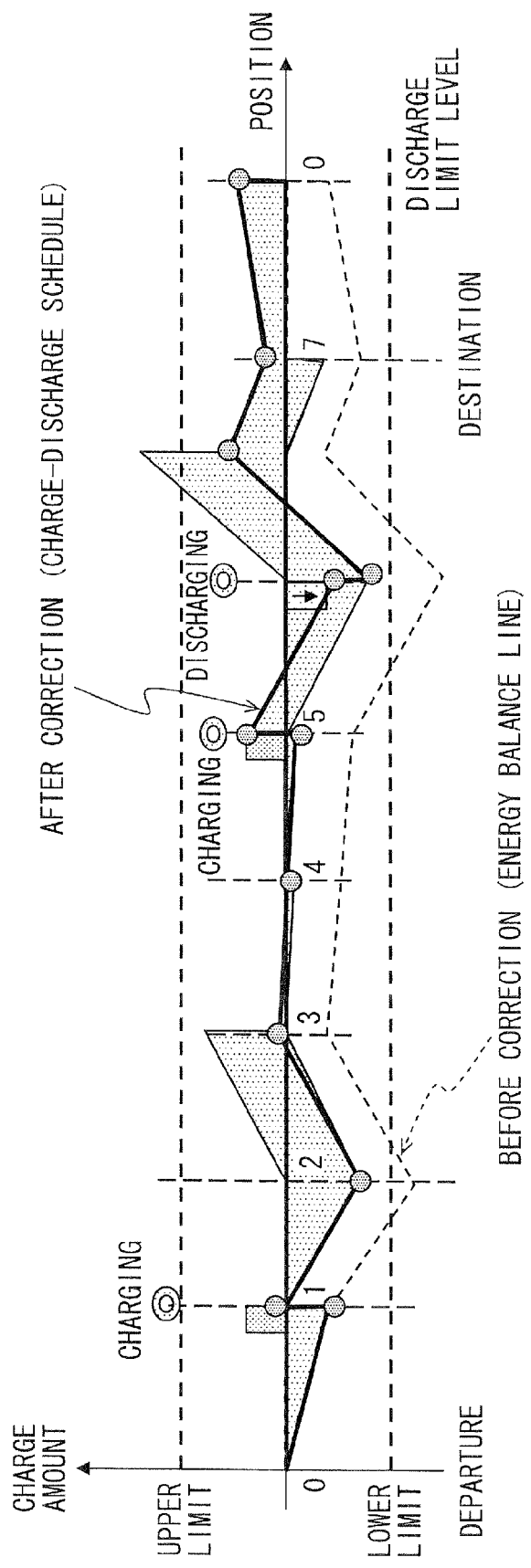
FIG. 7 is a diagram illustrating a manner of creating a discharge-charge schedule.

As opposed to the case illustrated in FIGS. 6 and 7, if the energy balance line exceeds the upper limit at a specific point, the charge-discharge management system 1 allows the rechargeable battery 101 to be charged with the external infrastructure or the like at a point just before the specific point, so that the charge amount stored in the rechargeable battery 101 can increase.

As described above, when it is determined that the energy balance line fails to fall within the upper limit and the lower limit of the predetermined range, the charge-discharge management system 1 corrects the charge-discharge schedule by planning to charge or discharge the rechargeable battery 101 using, for example, the infrastructure external to the vehicle or the like, so that the energy balance line indicted by the corrected charge-discharge schedule falls within the upper limit and the lower limit of the predetermined range.

When the energy balance line before being corrected falls within the upper limit and the lower limit of the predetermined range of the charge amount, the energy balance line before being corrected can be used as the charge-discharge schedule.

(2) Charge-discharge Schedule Correction Process

Figure 9:
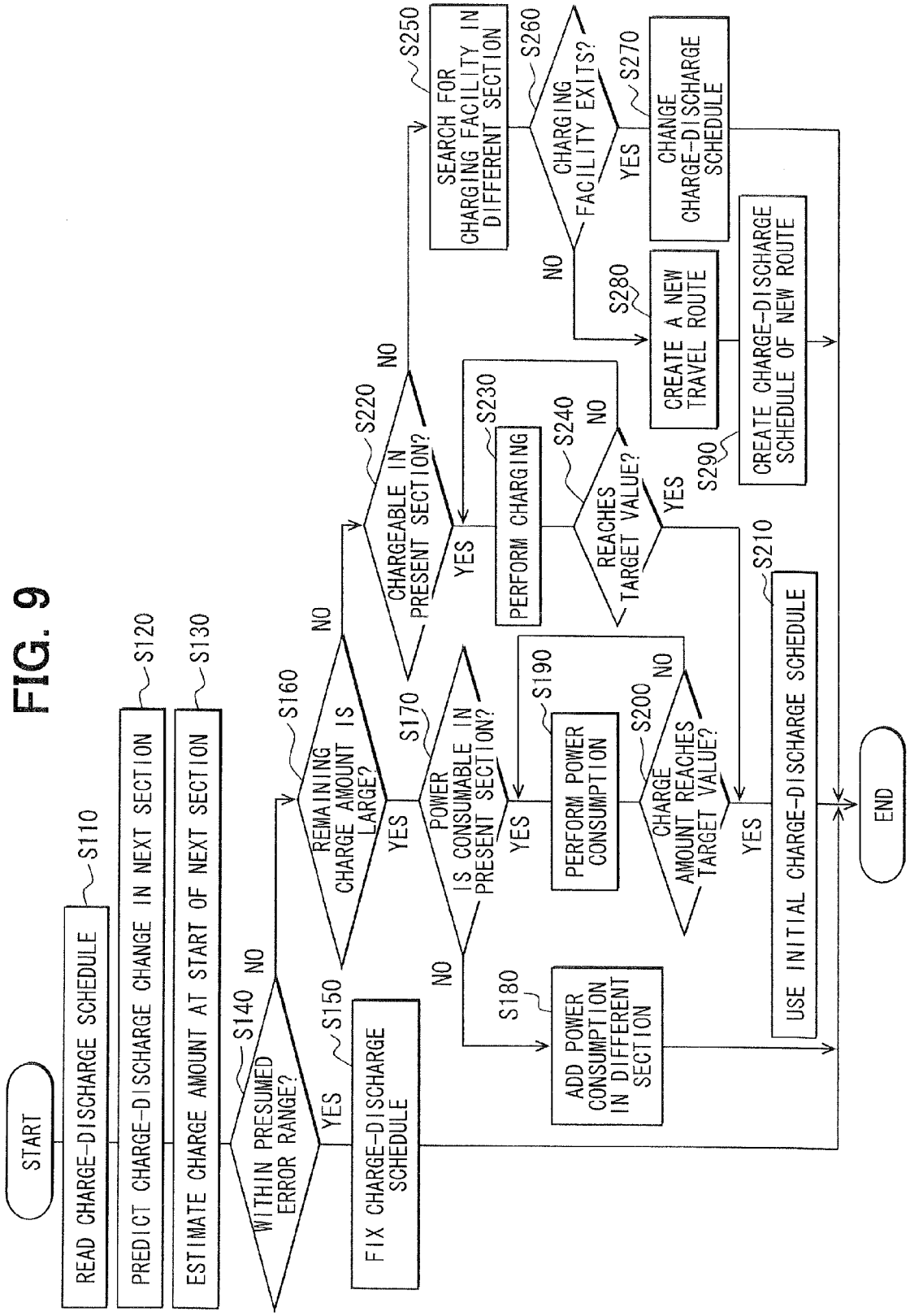
FIG. 9 is a flowchart illustrating a process for correcting a charge-discharge schedule.

A process for correcting the charge-discharge schedule will be described with reference to the flowchart of FIG. 9. This process is performed in each section of the travel route.

At S110, the main charge-discharge management devices 15 reads out the charge-discharge schedule for a next section. Herein, the next section is defined as a section next to a presently-traveling section where the subject is presently traveling. It should be noted that the charge-discharge schedule for a next section is a piece of the charge-discharge schedule for the travel route. At 120, if there is a gap etc. between the charge-discharge schedule read at S110 and a load amount schedule, the main charge-discharge management devices 15 calculates the charge-discharge schedule by taking into the gap etc. At S120, a charging-discharging change in the next section is predicted and calculated in consideration of a load amount difference.

At S130, a state of the rechargeable battery 101 in the presently-traveling section is measured. Further, he charge amount of the rechargeable battery 101 when the vehicle comes in the next section is calculated and estimated. At S140, it is checked how much the charge amount at the start of the next section calculated at S130 has an difference from the charge amount at the start of the next section indicated by the initial charge-discharge schedule. Further, it is determined whether the difference is within a presumed error range. When it is determined that the difference is within the presumed error range, corresponding to "YES" at S140, the process proceeds to S150. At S150, the main charge-discharge management device 15 determines to continue to use the initial charge-discharge schedule. In other words, the charge-discharge schedule is fixed.

When it is determined that the difference is beyond the presumed error range, corresponding to "NO" at S140, the process proceeds to S160. At S160, it is determined whether the charge amount calculated at S130 is larger than the charge amount at the start of the next section indicated by the initial charge-discharge schedule. In other words, it is determined whether a remaining capacity (charge amount) is larger. When it is determined that the charge amount calculated at S130 is larger than he charge amount at the start of the next section indicated by the initial charge-discharge schedule, corresponding to YES at S160, the process proceeds to S170. When it is determined that the charge amount calculated at S130 is larger than the charge amount at the start of the next section indicated by the initial charge-discharge schedule, corresponding to "NO" at S160, the process proceeds to S220.

At S170, it is determined whether, in the presently traveling section, it is possible to increase electric power consumption as compared with the initial charge-discharge schedule. For example, it is determined whether an operation like that at S190 is performable in the presently-traveling section. When it is not possible to increase the electric power consumption in the presently-traveling section, corresponding to "NO" at S170, the process proceeds to S180. At S180, a plan to perform an operation of consuming the electric power (e.g., electric power transmission to the infrastructure at a via-point, etc.) in a different section is added to the charge-discharge schedule. In the above, the different section is a section subsequent to the next section. At S190, an operation of consuming the electric power (e.g., a cooling storage operation, a heating operation or the like by the in-vehicle energy storage device 103) is performed in the presently-traveling section.

At S200, the charge amount of the rechargeable battery 101 at the start of the next section is calculated and estimated. Further, it is determined whether this calculated value of the charge amount of the rechargeable battery 101 at the start of the next section reaches a target value. When it is determined that the calculated value reaches the target value, corresponding to "YES" at S200, the process proceeds to S210. At S210, the main charge-discharge management device 15 determines to continue to use the initial charge-discharge schedule. When it is determined that the calculated value does not reach the target value, corresponding to "NO" at S200, the process returns to S190. When the vehicle arrives at the start point of the next section before the calculated value is determined to reach the target value at S200, the charge amount (battery level) at the time of arrival at the start point of the next is recorded. In addition, a difference of the actual charge amount from the target value is recorded. As errors, these values are considered in correcting the charge-discharge schedule in subsequent sections. If the different from the target value is abnormally large, the abnormally large difference is reported to the center.

When it is determined that the charge amount calculated at S130 is smaller than that in the next section indicated by the charge-discharge schedule, corresponding to "NO" at S160, the process proceeds to S220. At S220, it is determined whether a charging operation in the present section is addable. For example, it is determined whether an operation like that at S230 can be performed in the present section. When it is determined that the charging operation is addable, corresponding to "YES" at S220, the process proceeds to S230.

At S230, the electricity charging operation of charging the rechargeable battery 101 is performed. The charging operation may include, for example, charging the rechargeable battery 101 by an alternator operation FC (fuel cell), charging the rechargeable battery 101 from another vehicle, charging the rechargeable battery 101 from the infrastructure, or the like.

At S240, the charge amount of the rechargeable battery 101 at the start of the next section is calculated and estimated. Further, it is determined whether this calculated value of the charge amount of the rechargeable battery 101 at the start of the next section reaches a target value. When it is determined that the calculated value reaches the target value, corresponding to "YES" at S240, the process proceeds to S210. At S210, the main charge-discharge management device 15 determines to continue to use the initial charge-discharge schedule. When it is determined that the calculated value does not reach the target value, corresponding to "NO" at S240, the process returns to S230. When the vehicle arrives at the start point of the next section before the calculated value is determined to reach the target value at S240, the charge amount (battery level) at the time of arrival at the start point of the next section is recorded. In addition, a difference of the actual charge amount from the target value is recorded. As errors, these values are considered in correcting the charge-discharge schedule in subsequent sections. If the difference from the target value is abnormally large, the abnormally large difference is reported to the center.

When an addition of the charging operation in the present section is determined to be not possible, corresponding to "NO" at S220, the process proceeds to S250. At S250, the main charge-discharge management device 15 searches for a charging facility in sections (different section) other than the presently-traveling section in the selected travel route.

At S260, it is determined whether the charging facility in the different section has been successfully found. In other words, it is determined whether there is a charging facility in the different section of the selected travel route. When the charging facility in the different section has been successfully found, corresponding to "YES" at S260, the process proceeds to S270. At S270, the main charge-discharge management devices 15 corrects (changes) the charge-dischange schedule of the selected travel route so that the corrected charge-discharge schedule correction includes a plan to charge the rechargeable battery 101 in the different section where the charging facility is located. When the charging facility in the different sections has not been found, corresponding to "NO" at S260, the process proceeds to S280. At S280, the travel route for sections subsequent to the next section is changed into a new travel route that has a charging facility on the way.

At S290, the main charge-discharge management devices 15 creates a charge-discharge schedule of the travel route set at S280.

(3) Charge-discharge Schedule Re-creation Process

Figure 10:
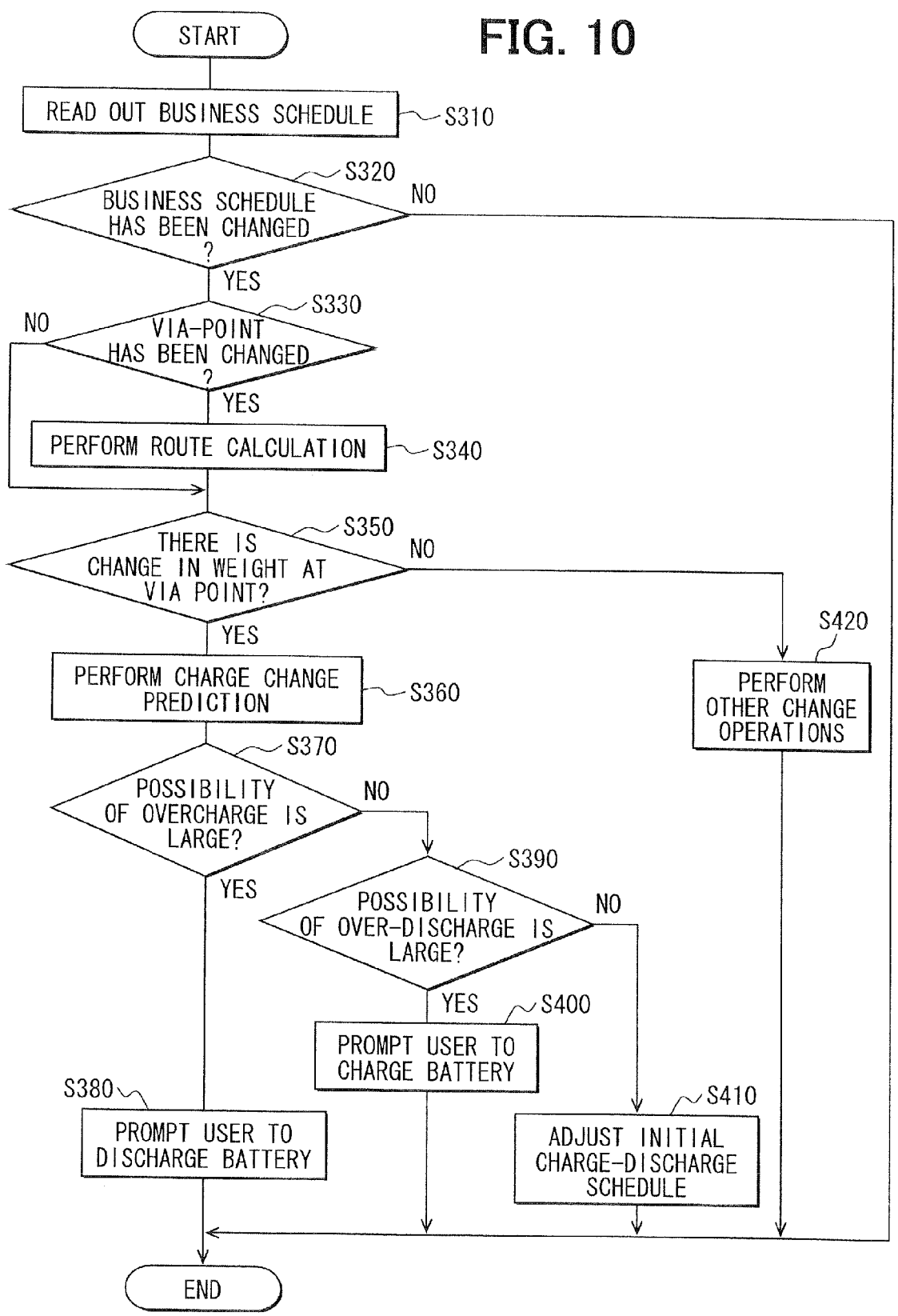
FIG. 10 is a flowchart illustrating a process for re-creating a charge-discharge schedule.

Next, the charge-discharge schedule re-creation process will be described with reference to the flowchart in FIG. 10. This process is performed by the main charge-discharge management device 15 when the charge-discharge management system 1 starts up at the via-point on the travel route. This via-point is normally a place where the load (e.g., goods, passenger) in the vehicle is unloaded.

At S310, from the center 500, the main charge-discharge management device 15 reads out the business schedule (e.g., a schedule for unloading a carried object, etc.) for a path after the via-point where the vehicle is presently located. At S320, it is determined whether the business schedule has been changed by comparing between the business schedule read out at S310 and the initial business schedule. In other words, it is determined at S320 whether there is a schedule change as compared with n initial condition. When it is determined that the business schedule has not bee changed, corresponding to "NO" at S320, this process is ended, and the charge-discharge schedule is not changed. When it is determined that the business schedule has been changed, corresponding to "YES" at S210, the process proceeds to S330.

At S330, it is determined whether a via-point has been changed. When the via-point has been changed, corresponding to "YES" at S330, the process proceeds to S340. At S340, the main charge-discharge management device 15 calculates multiple candidates of a travel route having the changed via-point on the way, and the process proceeds to S350. It should be noted that at S340, the user selects one of the multiple candidates as the travel route. When the via-point has not been changed, corresponding to "NO" at S330, the process proceeds to S350.

At S350, it is determined whether the weight of the load (e.g., goods, passenger) at the via-point has been changed as compared with the weight indicated by the initial business schedule. Alternatively, it may be determined whether a plan to change the weight of the load (e.g., goods, passenger) at a via-point has been changed as compared with the plan indicated by the initial business schedule. When the weight of the load has been changed, corresponding to "YES" at S350, the process proceeds to S360. When the weight of the load has not been changed, corresponding to "NO" at S350, the process proceeds to S420.

At S360, based on the change in weight of the load, the main charge-discharge management device 15 calculates the electric power consumption in each section and predicts a change in the charge amount at every point along the travel route from the electric power consumption in each section. In the above calculation and prediction, the main charge-discharge management device 15 takes into account altitude difference and undulation of the travel route.

At S370, it is determined from a result of the calculation at S360 whether a possibility of occurrence of overcharge at every future travel point (e.g., next via-point) is large. For example, it is determined whether the possibility that the overcharge occurs before a next via-point is larger than a predetermined threshold. When the possibility of the occurrence of overcharge is large, corresponding to "YES" at S370, the process proceeds to S380. When the possibility of the occurrence of overcharge is not large, corresponding to "NO" at S370, the process proceeds to S390.

At S380, a set of additional electric power consumption ways is proposed to a user. Further, the main charge-discharge management device 15 prompts a user to select an additional electric power consumption way. For example, if an infrastructure for discharging exists at a via-point, the discharging at the infrastructure is proposed. Alternatively, the additional electric power consumption ways may include storing energy in the vehicle, distributing the electricity to periphery vehicles, or the like. Then, the additional electric power consumption way selected by the user is added to the charge-discharge schedule; thereby, the charge-discharge schedule is corrected. It should be noted that the above additional electric power consumption may be performed at any point other than the via-point and before the point of the occurrence of the overcharge.

When it is determined at S370 that the possibility of an occurrence of overcharge at every future travel point is not large, the determination "NO" is made at S370, and the process proceeds to S390. At S390, based on the result of the calculation at S360, it is determined whether the possibility of over-discharge at every future travel point (e.g., next via-point) is large. Alternatively, it may be determined whether the possibility that the over-discharge occurs before the next-via point is larger than a predetermined threshold. In the above, the over-discharge is defined as a state where the stored electricity amount is smaller than the lower limit. When the possibility of over-discharge is large, corresponding to "YES" at S390, the process proceeds to S400. When the possibility of over-discharge is not large, corresponding to "NO" at S390, the process proceeds to S410.

At S400, a set of additional electric power charge ways is proposed to a user. Further, the main charge-discharge management device 15 prompts a user to select an additional electric power charge way. For example, if an infrastructure for charging exists at a via-point, the charging at the infrastructure is proposed. Alternatively, power feed from a periphery vehicle is proposed. Then, the additional electric power charge way selected by the user is added to the charge-discharge schedule; thereby, the charge-discharge schedule is corrected. It should be noted that the above additional electric power charge may be performed at any point other than the via-point before the point of the occurrence of the over-discharge.

At S410, the main charge-discharge management device 15 determines to constitute to use the initial charge-discharge schedule. When it is determined that there is no change in the weight of the load at the via-point, the determination "NO" is made at S350, and the process proceeds to S420. At S420, a predetermined change operation is performed.

Figure 11A:
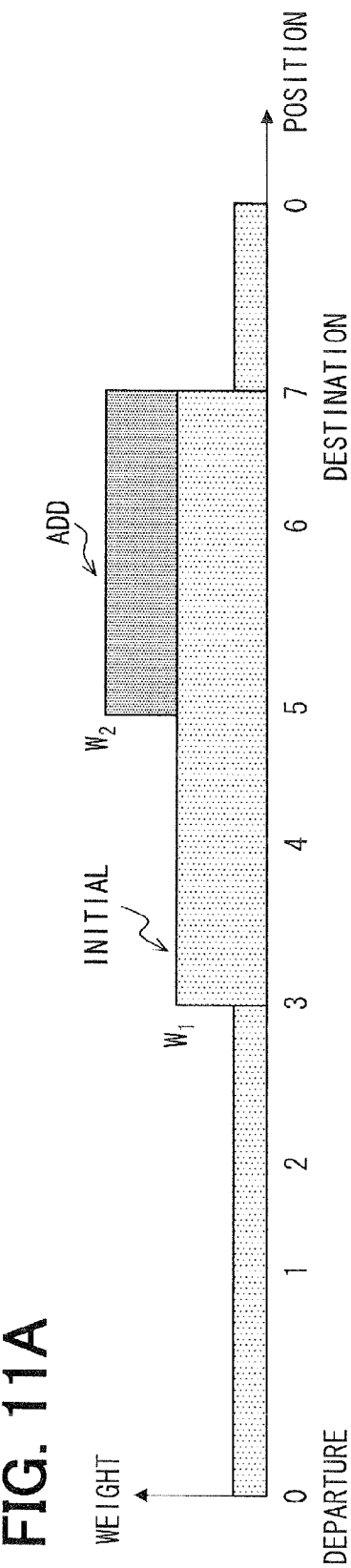
FIG. 11A is a graph illustrating a change in load weight (operation schedule)

Next, a concrete example of the process illustrated in FIG. 10 will be described with reference to FIGS. 11A and 11B. FIG. 11A illustrates a graph showing a change in the load in the vehicle (business schedule) in a travel route. According to an original business schedule, an object with weight of W1 is loaded at the point "3", and this loaded object is unloaded at the point "7". However, when the vehicle is traveling on the travel route, the original business schedule is changed into the following schedule. After the object with weight W1 is loaded at the point "3", another object with weight W2 is further loaded at point 5, and both of the loaded object with weight W1 and the loaded object with weight W2 are unloaded at the point "7".

Figure 11B:
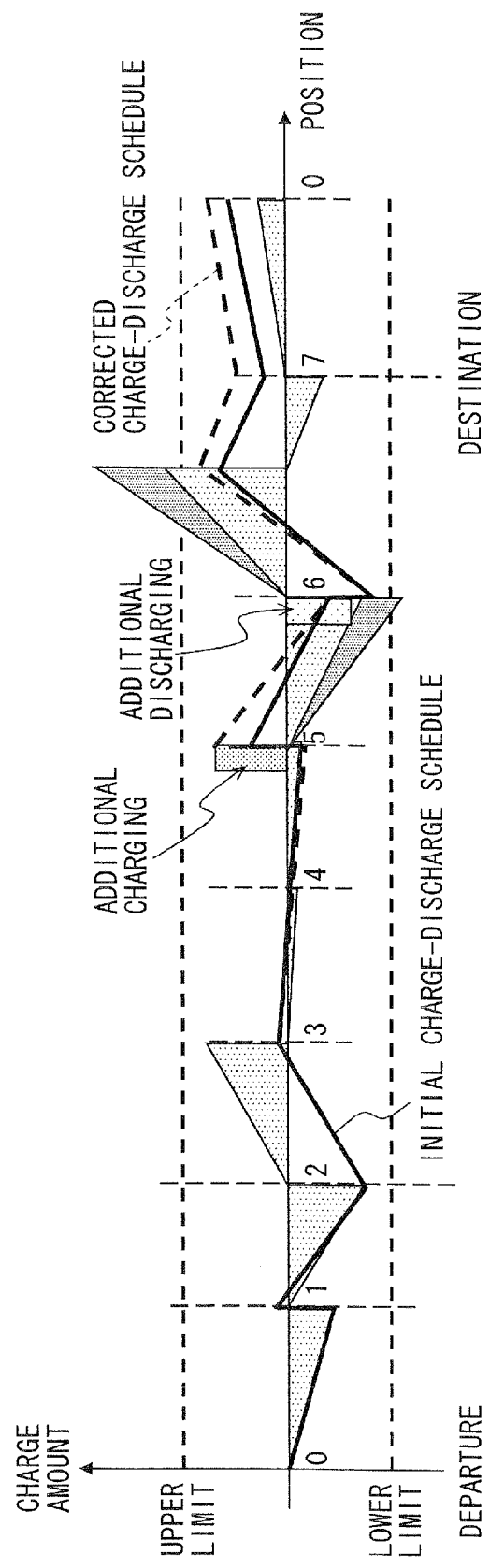
FIG. 11B is a graph illustrating charge-discharge schedules before correction and after correction.

In FIG. 11B, a solid line shows an initial charge-discharge schedule created based on the initial business schedule. A broken line shows a corrected charge-discharge schedule, which has been made at the charge-discharge schedule re-creation process illustrated in FIG. 10 in response to addition of the object with weight W2.

Since the weight of the loaded object increases after the point "5 in the corrected business schedule, the electric power consumption in the up-hill section "5-6" increases as compared with the initial business schedule. Because of this, the consistent use of the initial charge-discharge schedule leads to a situation where the charge amount of the rechargeable battery 101 falls below the lower limit at the point "6" (corresponding "YES" at S390). By contrast, since the corrected charge-discharge schedule increases the charged amperehour at the point "5" (corresponding to S400), the corrected charge-discharge schedule keeps the change amount at the point "6" above the lower limit.

Furthermore, since the weight of the loaded object after the point "6" increases, an electricity generation amount in the section "6-7" in the corrected business schedule increases as compared with the initial business schedule. Because of this, the consistent use of the initial charge-discharge schedule leads to a situation where the charge amount of the rechargeable battery 101 exceeds the upper limit at the point "7" (corresponding to "YES" at S370). By contrast, since the corrected charge-discharge schedule increases the discharged amperehour at the point "6" (corresponding to S380), the corrected charge-discharge schedule keeps the charge amount at the point "6" below the upper limit.

3. Advantage of Charge-discharge Management System 1 for Vehicle

The charge-discharge management system 1 for a vehicle creates a charge-discharge schedule by taking into account not only the condition of the rechargeable battery 101 but also a further travel route (a route that the vehicle is going to travel), a road condition, a loaded object change, and the like. Therefore, the charge-discharge management system 1 can prevent the overcharge and over-discharge of the rechargeable battery 101.

Moreover, for each section of the travel route, the charge-discharge management system 1 makes a comparison between an actual charge amount and a predicted charge amount, which is predicted according to the charge-discharge schedule. In accordance with a result of the comparison, the charge-discharge management system 1 corrects the charge-discharge schedule for subsequent sections. Thereby, the charge-discharge management system 1 can more appropriately manage the state of the rechargeable battery 101. In addition, even if there is a change in the travel route or the business schedule while the vehicle is traveling, it is possible to appropriately re-create the charge-discharge schedule in response to such travel route change, the business schedule or the like. Therefore, it is possible to appropriately manage the state of the rechargeable battery 101.

Embodiments of the present invention are not limited to the above-described embodiments, and can have various forms. For example, the energy balance line and the charge-discharge schedule may be calculated in consideration of a road surface condition (e.g., friction, curvature) in addition to the loaded object weight, height (altitude) of the travel route, and the uphill and downhill of the travel route etc.

According to an example of embodiments, a charge-discharge management system for a vehicle that runs using electricity stored in a battery includes a charge-discharge schedule creation unit and a charge-discharge schedule correction unit. The charge-discharge schedule creation unit is configured to create a charge-discharge schedule of the battery for a travel route of the vehicle according to the travel route of the vehicle and a condition of at least one of the vehicle and a road, so that a charge amount of the battery falls within a predetermined range in the travel route. The charge-discharge schedule correction unit is configured to: divide the travel route into a plurality of sections; make a comparison between the charge amount actually in the battery and the charge amount in the charge-discharge schedule at every section of the plurality of sections, thereby providing a result of the comparison; and correct the charge-discharge schedule for subsequent sections according to the result of the comparison, wherein the subsequent sections are sections subsequent to where the comparison is made.

The above charge-discharge management system can create the charge-discharge schedule by taking into account not only a condition of the battery but also the following: the travel route which the vehicle is going to travel; vehicle condition; road condition; and he like. Therefore, an occurrence of the over-charge and over-discharge of the battery when the vehicle is traveling the travel route can be prevented.

Moreover, the above charge-discharge management system makes the comparison between the charge amount actually in the battery and the charge amount in the charge-discharge schedule at every section of the plurality of sections, and corrects the charge-discharge schedule for subsequent sections according to the result of the comparison. Therefore, it is possible to appropriately manage the state of the battery.

Moreover, even if the travel route or business schedule (schedule for loading and unloading a object such as a passenger, goods and the like) is changed when the vehicle is traveling, it is possible to re-create the charge-discharge schedule in response to such change and appropriately manage the state of the battery The condition of the vehicle includes, for example, an amount of load carried by the vehicle. This amount of load may be weight of a loaded object or weight of a passenger, or alternatively a sum of the weight of the loaded object and the weight of the passenger. The condition of the road may include, for example, at least one of: uphill and downhill of the road; unevenness of the road; and curvature radius of the road.

The above charge-discharge management system may further include a charge-discharge schedule re-creation unit configured to re-create the charge-discharge schedule in response to an occurrence of a change in via-point of the travel route and a change in the amount of load carried by the vehicle when the vehicle is traveling along the travel route. In this configuration, it is possible to appropriately manage the state of the battery even if the change in via-point or the change in the load carried n occurrence of a change in via-point of the travel route and a change in the amount of load carried by the vehicle happens when the vehicle is traveling along the travel route.

According to another example of embodiments, a charge-discharge management apparatus mounted to a commercial vehicle that travels using electricity stored in a battery of the commercial vehicle includes a communication device, a charge-discharge schedule creation device, a charge-discharge schedule correction device and a charge-discharge schedule re-creation device. The communication device is configured to communicate with a center to receive information on a business schedule indicating a travel route of the vehicle for transportation of goods. The charge-discharge schedule creation device is configured to create a charge-discharge schedule of the battery for the travel route of the commercial vehicle according to the business schedule and a condition of at least one of the commercial vehicle and a road. The charge-discharge schedule is a schedule for charging and discharging the battery to keep a charge amount of the battery within a predetermined range all along the travel route. The charge-discharge schedule correction device is configured to correct the charge-discharge schedule correction by: dividing the travel route into a plurality of sections; making a comparison between the charge amount actually in the battery and the charge amount in the charge-discharge schedule at every section of the plurality of sections, thereby providing a result of the comparison; and correcting the charge-discharge schedule for subsequent sections according to the result of the comparison, the subsequent sections being sections subsequent to where the comparison is made. The charge-discharge schedule re-creation device is configured to re-create the charge-discharge schedule in response to a change in the business schedule. The condition of the commercial vehicle includes an amount of load carried by the commercial vehicle. The condition of the road includes at least one of: uphill and downhill of the road; unevenness of the road; and curvature radius of the road.

While the invention has been described above with reference to various embodiments thereof, it is to be understood that the invention is not limited to the above described embodiments and constructions. The invention is intended to cover various modifications and equivalent arrangements.

Further, each or any combination of processes or steps explained in the above may be achieved as a software means or units (e.g., subroutine) and/or a hardware means or units (e.g., circuit or integrated circuit), including or not including a function of a related device; furthermore, the hardware means or units can be constructed inside of a microcomputer.

Furthermore, the software means or units or any combinations of multiple software means or units may be implemented via a software program, which is encoded in a computer-readable storage media or is installed in a computer.

What is claimed is:

1. A charge-discharge management system for a vehicle that runs using electricity stored in a battery, the charge-discharge management system comprising:
a charge-discharge schedule creation unit configured to create a charge-discharge schedule of the battery for a travel route of the vehicle according to the travel route of the vehicle and a condition of at least one of the vehicle and a road, so that a charge amount of the battery falls within a predetermined range in the travel route;
a charge-discharge schedule correction unit configured to divide the travel route into a plurality of sections,
make a comparison between the charge amount actually in the battery and the charge amount in the charge-discharge schedule at every section of the plurality of sections, thereby providing a result of the comparison, and
correct the charge-discharge schedule for subsequent sections according to the result of the comparison, wherein the subsequent sections are sections subsequent to where the comparison is made;
a charge-discharge schedule re-creation unit configured to re-create the charge-discharge schedule in response to an occurrence of a change in a via-point of the travel route or a change in the amount of load carried by the vehicle when the vehicle is traveling along the travel route; and
a management device configured to:
propose a plurality of additional electric power consumption ways to a user of the vehicle when an over-charged point, at which the battery is to be over-charged, is present in the re-created charge-discharge schedule;
add to the re-created charge-discharge schedule an additional electric power consumption way that is selected by the user of the vehicle from the plurality of proposed additional electric power consumption ways;
propose a plurality of additional electric power charging ways to the user of the vehicle when an over-discharged point, at which the battery is to be over-charged, is present in the re-created charge-discharge schedule; and
add to the re-created charge-discharge schedule an additional electric power charging way that is selected by the user of the vehicle from the plurality of proposed additional electric power charging ways, wherein electric power transmission to or charging from an infrastructure external to the vehicle is addable to the charge-discharge schedule.

2. The charge-discharge management system according to claim 1, wherein:
the condition of the vehicle includes an amount of load carried by the vehicle.

3. The charge-discharge management system according to claim 1, wherein:
the condition of the road includes at least one of: uphill and downhill of the road; unevenness of the road; and curvature radius of the road.

4. The charge-discharge management system according to claim 1, further comprising:
an in-vehicle energy storage device configured to perform a cooling storage operation or a heating operation with respect to the electricity stored in the battery,
wherein:
when the charge amount actually in the battery is larger than the charge amount in the charge-discharge schedule, the in-vehicle energy storing device performs the cooling storage operation or the heating operation.

5. The charge-discharge management system according to claim 1, further comprising:
a wireless electric power transmission reception device configured to wirelessly transmit electric power to outside of the vehicle or wirelessly receive electric power from outside of the vehicle, for keeping the charge amount of the battery within the predetermined range in the travel route.

6. A charge-discharge management apparatus mounted to a commercial vehicle that travels using electricity stored in a battery of the commercial vehicle, the charge-discharge management apparatus comprising:
a communication device configured to communicate with a center to receive information on a business schedule indicating a travel route of the vehicle for transportation of goods;
a charge-discharge schedule creation device configured to create a charge-discharge schedule of the battery for the travel route of the commercial vehicle according to the business schedule and a condition of at least one of the commercial vehicle and a road, wherein the charge-discharge schedule is a schedule for charging and discharging the battery to keep a charge amount of the battery within a predetermined range all along the travel route;
a charge-discharge schedule correction device configured to correct the charge-discharge schedule correction by dividing the travel route into a plurality of sections,
making a comparison between the charge amount actually in the battery and the charge amount in the charge-discharge schedule at every section of the plurality of sections, thereby providing a result of the comparison, and
correcting the charge-discharge schedule for subsequent sections according to the result of the comparison, the subsequent sections being sections subsequent to where the comparison is made; and
a charge-discharge schedule re-creation device configured to re-create the charge-discharge schedule in response to a change in the business schedule when the commercial vehicle is traveling along the travel route; and
a management device configured to:
propose a plurality of additional electric power consumption ways to a user of the commercial vehicle when an over-charged point, at which the battery is to be over-charged, is present in the re-created charge-discharge schedule;
add to the re-created charge-discharge schedule an additional electric power consumption way that is selected by the user of the commercial vehicle from the plurality of proposed additional electric power consumption ways;
propose a plurality of additional electric power charge ways to the user of the commercial vehicle when an over-discharged point, at which the battery is to be over-charged, is present in the re-created charge-discharge schedule; and
add to the re-created charge-discharge schedule an additional electric power charge way that is selected by the user of the commercial vehicle from the plurality of proposed additional electric power charge ways,
wherein:
electric power transmission to or charging from an infrastructure external to the vehicle is addable to the charge-discharge schedule;
the condition of the commercial vehicle includes an amount of load carried by the commercial vehicle; and
the condition of the road includes at least one of: uphill and downhill of the road; unevenness of the road; and curvature radius of the road.

* * * * *